(12) United States Patent
Kuster et al.

(10) Patent No.: US 10,823,949 B2
(45) Date of Patent: Nov. 3, 2020

(54) BEAM SPLITTER DEVICE HAVING AT LEAST TWO BEAMSPLITTING SURFACES WITH DIFFERENT REFLECTION-TO-TRANSMISSION RATIOS

(71) Applicant: LEICA INSTRUMENTS (SINGAPORE) PTE. LTD., Singapore (SG)

(72) Inventors: Manfred Kuster, Widnau (CH); Heinrich Wilhelm Dreyer, Constance (DE); Heinz Suhner, Rebstein (CH); Luca Tobler, Heerbrugg (CH); Marc Hocke, Heerbrugg (CH); Patrick Wolf, Au (CH); Ralf Koerber, Zurich (CH)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 224 days.

(21) Appl. No.: 15/766,807

(22) PCT Filed: Oct. 14, 2016

(86) PCT No.: PCT/SG2016/000018
§ 371 (c)(1),
(2) Date: Apr. 7, 2018

(87) PCT Pub. No.: WO2017/065688
PCT Pub. Date: Apr. 20, 2017

(65) Prior Publication Data
US 2018/0307028 A1    Oct. 25, 2018

(30) Foreign Application Priority Data

Oct. 14, 2015 (EP) .................................. 15189702

(51) Int. Cl.
*G02B 21/00* (2006.01)
*G02B 21/36* (2006.01)
(Continued)

(52) U.S. Cl.
CPC ........... *G02B 21/361* (2013.01); *G02B 21/18* (2013.01); *G02B 21/22* (2013.01); *G02B 21/36* (2013.01);
(Continued)

(58) Field of Classification Search
CPC .... G02B 21/00; G02B 21/0032; G02B 21/24; G02B 21/36; G02B 21/362; G02B 27/10;
(Continued)

(56) References Cited

U.S. PATENT DOCUMENTS 4,685,776 A    8/1987 Inoue et al.
5,235,459 A    8/1993 Meyer et al.
(Continued)

*Primary Examiner* — Thong Q Nguyen
(74) *Attorney, Agent, or Firm* — Hodgson Russ LLP

(57) ABSTRACT

A beam splitter device (1) for a microscope (2), and for a microscope imaging method, supports at least two beamsplitting surfaces (4, 14). The two beamsplitting surfaces (4, 14) have different reflection-to-transmission ratios. The beam splitter device (1) has an optical path (3, 3a, 3b). A first one of the two beamsplitting surfaces (4, 14) is configured to be moved from a first operation position (15), in which the first beamsplitting surface (4) is located in the optical path, to a second operation position (16), in which a second (14) of the beamsplitting surfaces (4, 14) is located in the optical path. With this configuration, it is possible to change the available light in the branches (3a, 3b) of the optical path (3) after the beamsplitting surface (4, 14). This is useful if one of the branches (3a, 3b) is directed to an exit port (8) configured to receive a camera. By directing more light to the camera exit port (8), the image quality of the camera is improved.

14 Claims, 6 Drawing Sheets

Figure 1:
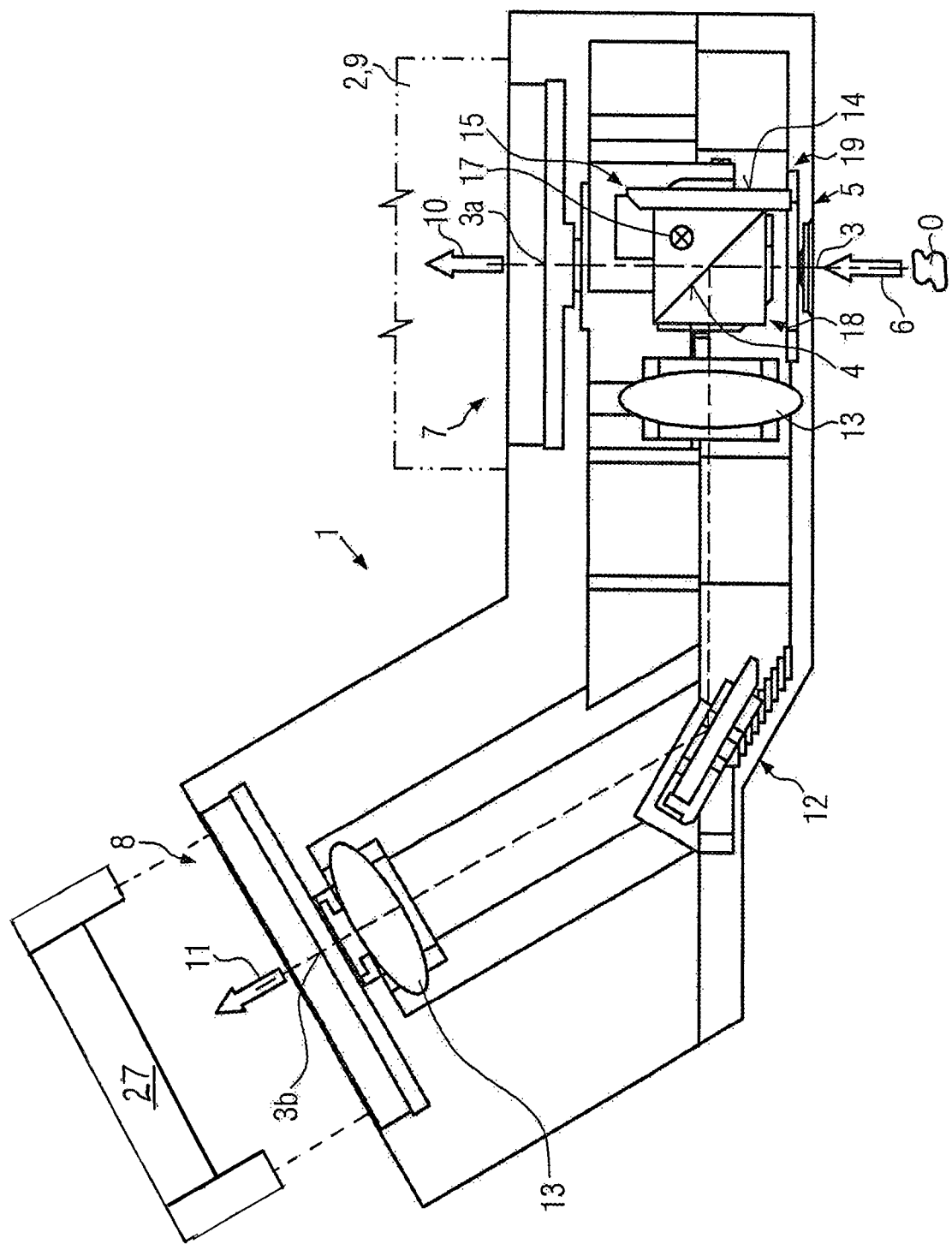

(51) Int. Cl.
  *G02B 27/10*    (2006.01)
  *G02B 27/14*    (2006.01)
  *G02B 21/18*    (2006.01)
  *G02B 21/22*    (2006.01)

(52) U.S. Cl.
  CPC ....... *G02B 27/1073* (2013.01); *G02B 27/144* (2013.01); *G02B 21/362* (2013.01); *G02B 27/14* (2013.01)

(58) Field of Classification Search
  CPC .. G02B 27/1073; G02B 27/14; G02B 27/144; G02B 7/00; G02B 7/003; G02B 7/18
  See application file for complete search history.

(56) References Cited

U.S. PATENT DOCUMENTS

| | | | |
|---|---|---|---|
| 5,576,897 A * | 11/1996 | Kuo | G02B 7/14 359/441 |
| 5,777,783 A | 7/1998 | Endou et al. | |
| 6,276,804 B1 | 8/2001 | Tandler et al. | |
| 6,594,076 B2 * | 7/2003 | Satou | G02B 21/082 359/368 |
| 7,180,689 B2 * | 2/2007 | Shinada | G02B 21/18 359/372 |
| 7,480,094 B2 * | 1/2009 | Hermann | G02B 21/361 359/381 |
| 7,505,199 B2 * | 3/2009 | Ito | G02B 21/20 359/363 |
| 2007/0263204 A1 | 11/2007 | Ju | |
| 2015/0297311 A1 | 10/2015 | Tesar | |
| 2020/0033575 A1 * | 1/2020 | Mueller | G02B 21/0012 |

\* cited by examiner

BEAM SPLITTER DEVICE HAVING AT LEAST TWO BEAMSPLITTING SURFACES WITH DIFFERENT REFLECTION-TO-TRANSMISSION RATIOS

CROSS-REFERENCE TO RELATED APPLICATIONS

The present application is the U.S. national phase of International Application No. PCT/SG2016/000018 filed Oct. 14, 2016, which claims priority of European Application No. 15189702.2 filed Oct. 14, 2015, the entire disclosure of which is incorporated herein by reference.

FIELD OF THE INVENTION

The invention relates to a beam splitter device for a microscope, in particular a stereoscopic microscope, a microscope comprising such a beam splitter device, and a microscope imaging method.

BACKGROUND OF THE INVENTION

Beam splitter devices are used for a variety of purposes in microscopes. One purpose is to divert part of the incident light of an observed object to a camera in particular a 3D camera, while at the same time allowing to observe the object e.g. through a binocular tube.

In some instances, however, the light which is available at the camera is not sufficient to achieve a satisfactory image quality.

SUMMARY OF THE INVENTION

It is therefore the object of the present invention to improve the known beam splitter devices, so that the full image quality of a camera can be used, without compromising the ability to view the object through e.g. a binocular or monocular tube.

This object is achieved for the beam splitter device as initially mentioned in that the beam splitter supports at least two beamsplitting surfaces, each of the at least two beamsplitting surfaces being configured to provide a different reflection-to-transmission ratio, the beam splitter device further comprising an optical path and at least one of the at least two beamsplitting surfaces being configured to be moved from a first operation position, in which a first of the at least two beamsplitting surfaces is located in the optical path, to a second operation position, in which a second of the at least two beamsplitting surfaces is located in the optical path.

For the microscope imaging method as mentioned in the beginning, this object is solved by directing light from an observed object along an optical path to an exit port, wherein the light available at the exit port is changed by switching a second beamsplitting surface into the optical path instead of a first beamsplitting surface, wherein the second beamsplitting surface has a different reflection-to-transmission than the first beamsplitting surface.

The reflection-to-transmission ratio, often denominated as R:T, of a beamsplitting surface indicates which amount of light is diverted to a first branch of the optical path by reflection of the incident light and how much of the incident light is diverted to a second branch of the optical path by transmission of the incident light. The transmitted branch of the optical path reaches through the beamsplitting surface whereas the reflected light defines a branch of the optical path which is reflected at the surface and thus split from the transmitted part. Reflection-to-transmission ratios can assume any value between 0:100, meaning that all of the incident light is transmitted and none is reflected so that there is no reflected branch of the optical path, to R:T=100:0, meaning that all incident light is reflected, so that there is only the branch defined by the reflected light and no branch of the optical path from transmitted light. Other typical values may be R:T=20:80, 50:50 or 80:20. A value of R:T=20:80 means that 20% of the incoming light is reflected by and 80% is transmitted through the beamsplitting surface.

In that the beam splitter device supports at least two beamsplitting surfaces having different reflection-to-transmission ratios, various relative light intensities can be realized in the reflected and the transmitted branches of the optical path by a single beam splitter device depending on which of the beamsplitting surfaces has been moved into the optical path. This allows to make full use of e.g. a camera system which is arranged in one branch of the optical path. If, for example, there is only a very weak illumination so that the camera has to operate at very low light conditions, it is possible to switch to a surface with high reflectance into the optical path which directs more light to the camera and thus increases the intensity in the branch of the optical path leading to the camera.

The solution according to the invention can be improved by the following advantageous features, which are independent of one another and can be combined independently.

For example, it is advantageous if the first beamsplitting surface is, in the first operation position, located at the location in the optical path where, in the second operation position, the second beamsplitting surface is located.

In general, the number of operation positions should correspond to the number of beamsplitting surfaces supported by the beam splitter device. Preferably, each one of the plurality of beamsplitter surfaces is adapted to be moved into the optical path, preferably at the location where the other beamsplitting surface is located if it is moved into the optical path. In at least one of the available operation positions only one branch of the optical path may be present, whereas in at least one of the other operating positions, two or more branches of the optical path may be present. Only one branch of the optical path may be present if the beamsplitting surface, which is currently located in the optical path, has an R:T ratio of 0:100 or 100:0.

The movement, by which at least one of the beamsplitting surfaces is moved into the optical path, can be at least one of a rotational and a translational movement. At least one beamsplitting surface may be rotated out of and/or into the optical path and/or at least one beamsplitting surface may be translated away from and/or into the optical path. In particular, at least one beamsplitting surface may be moved away from or into the optical path by being both rotated and translated.

For example, in the first operation position, at least one of the first and second beamsplitting surfaces may be rotated about an axis of rotation with respect to the second operation position. The axis of rotation may be orientated at least one of parallel and perpendicular to at least one section of the optical path which is located behind the respective beamsplitting surface which is currently located in the optical path.

At least two beamsplitting surfaces may be located on a single optical element, which is preferably moveable. Such an optical element may be a mirror or a beam splitter. Additionally or alternatively, at least two beamsplitting surfaces may be located on different optical elements of which preferably at least one is moveable.

If, for example, a compound beam splitter is used as an optical element, two of its surfaces providing different reflection-to-transmission ratios may be used as beamsplitting surfaces. In particular, in one operation position, e.g. the first operation position, an internal beamsplitter surface of the compound beam splitter may be moved into the optical path to effectively split the optical path into two branches or allow full reflection or transmission, whereas in the other operation position an outer surface of the compound beam splitter providing a different reflection-to-transmission ratio may be moved in the optical path.

Switching the optical element from one operation position to the other operation position may in particular comprise its rotation and/or its translationary movement.

The beam splitter device may be configured as an optical unit which can be pre-assembled as a single assembly ready to be mounted to a binocular tube of a microscope. For this, the beam splitter device may have an exit port which is adapted to be attached to a binocular tube. The beam splitter device may comprise a second exit port which is adapted to be attached to a camera, in particular a 3D camera.

The two branches of the optical path which are generated by at least one of the at least two beamsplitting surfaces may be orientated perpendicular to each other at least at an exit of the respective beamsplitting surface.

The branch of the optical path leading to the exit port for the camera may be longer, in particular by more than an integer multiple, than the optical path leading to the exit port for the binocular tube. The camera exit port may be oriented at an oblique angle with respect to the binocular tube. To allow for mounting the camera at an oblique angle, the beam splitter device may comprise a mirror in one branch of the optical path, in particular the branch leading to the exit port for the camera.

At least one part of the optical path, preferably the part leading to the exit port for the camera, may comprise a relay lens system. Such a relay lens system allows to positively influence the location of the pupil for the exit port. The relay lens system allows to generate an image at the camera exit port which is almost free of vignetting.

Instead of or in addition to the relay lens system, an afocal zoom system may be used. This allows a variation of the magnifying factor at the exit port.

At least one of the lenses of the relay lens system and/or the afocal zoom system may be movable in order to allow fine focusing.

The beam splitter device may have all its components integrated into a housing so that existing microscopes may be retrofitted.

The movement of the at least one beamsplitting surface to effect the switching from the first to the second operation position can be hand-operated, e.g. effected by purely mechanical means. A slotted guide system may be used to guide the movements of the beamsplitting surfaces. For a smooth operation, a mechanical, an electric or electro-mechanical actuator may be provided in the beam splitter device to move the at least two beamsplitting surfaces from one operation position to the other.

The beam splitter device may further comprise a magazine to which the at least two beamsplitting surfaces may be attached stationary. The magazine may be supported moveably by a frame of the beam splitter device. For operating the magazine, a manipulator may be provided which is accessible from outside the beam splitter device. Upon operation, the manipulator may switch the at least two beamsplitter surfaces from the first to the second position and/or from the second to the first position.

In combination with a camera at one of the exit ports, it is particularly advantageous if at least one of the two beamsplitting surfaces has a reflection-to-transmission ratio of 100:0 or 0:100, so that all of the incident light from the object to be observed can be directed to the camera exit port.

The beam splitter device according to one of the aforementioned embodiments may also be integrated into a microscope without constituting a unitary part of the microscope. Therefore, the invention also relates to a microscope having such a beam splitter device.

In the following, the invention is described in greater detail using in exemplary embodiments with reference to the accompanying figures. The various features in the embodiments may be freely combined as is explained above. If, for a particular application, the advantage which is realized by a particular feature is not needed, this feature can be omitted.

BRIEF DESCRIPTION OF THE DRAWING VIEWS

In the drawings, the same reference numeral is used for elements which correspond to each other with respect to their design and/or their function.

FIG. 1: shows a schematic cut view through a first embodiment of a beam splitter device according to the invention in a first operation position.

Figure 2:
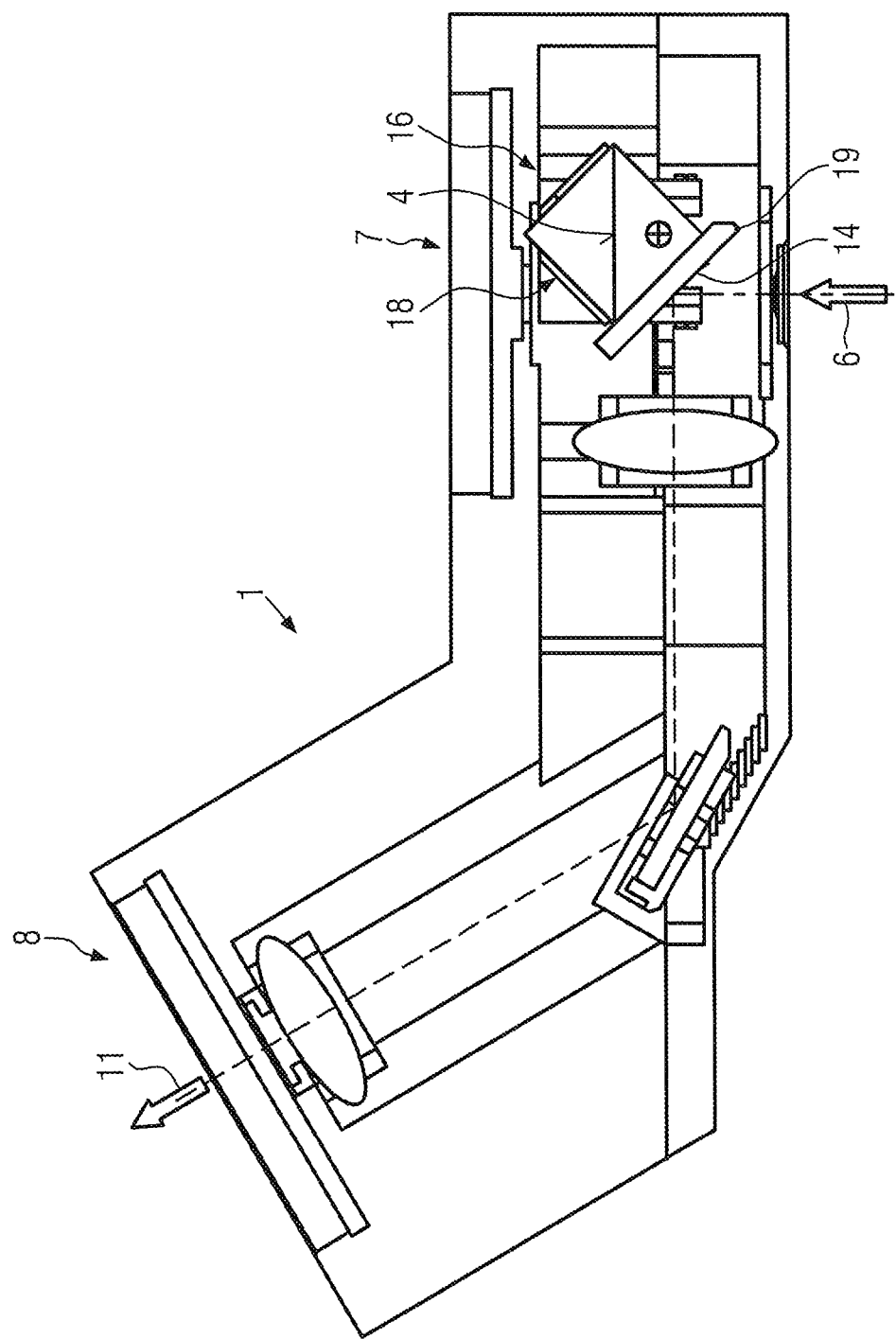

FIG. 2: shows a schematic cut view of the embodiment of FIG. 1 in a second operation position.

Figure 3:
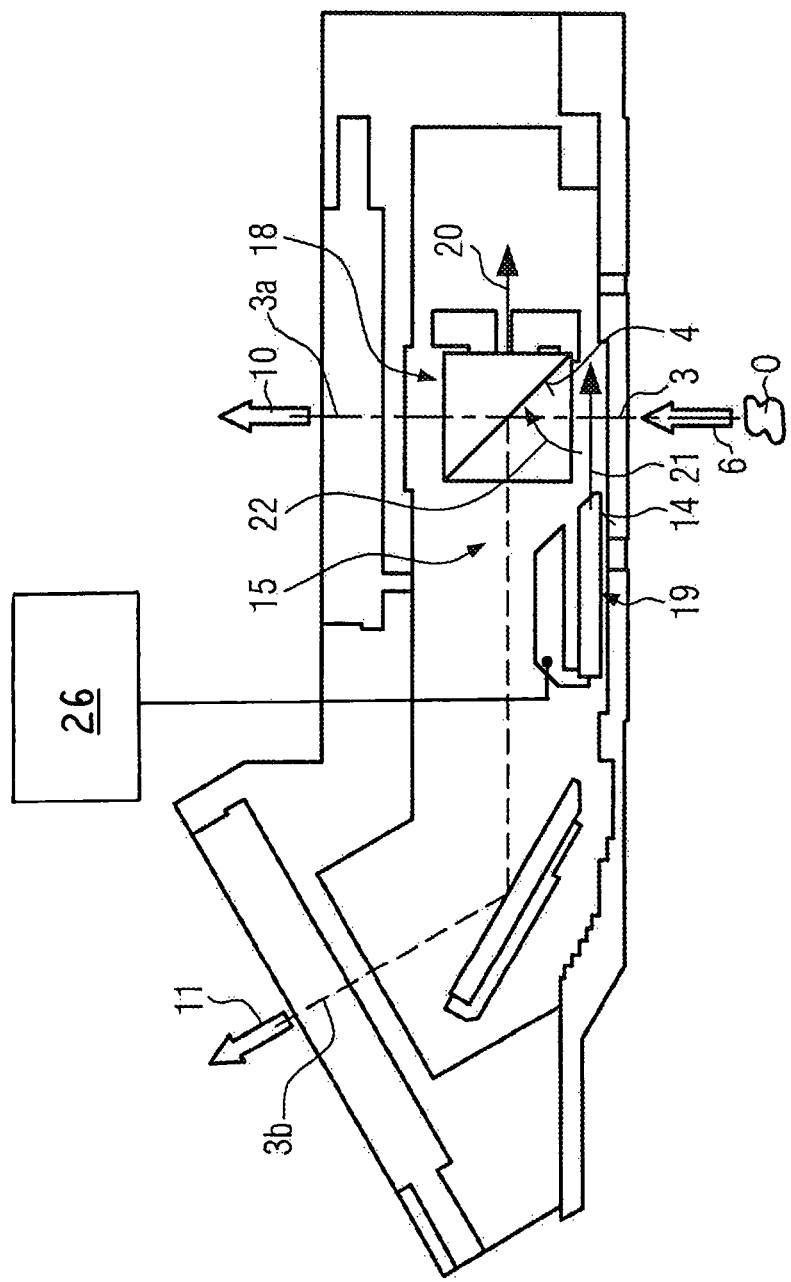

FIG. 3: shows a schematic cut view through a second embodiment of a beam splitter device according to the invention in a first operation position.

Figure 4:
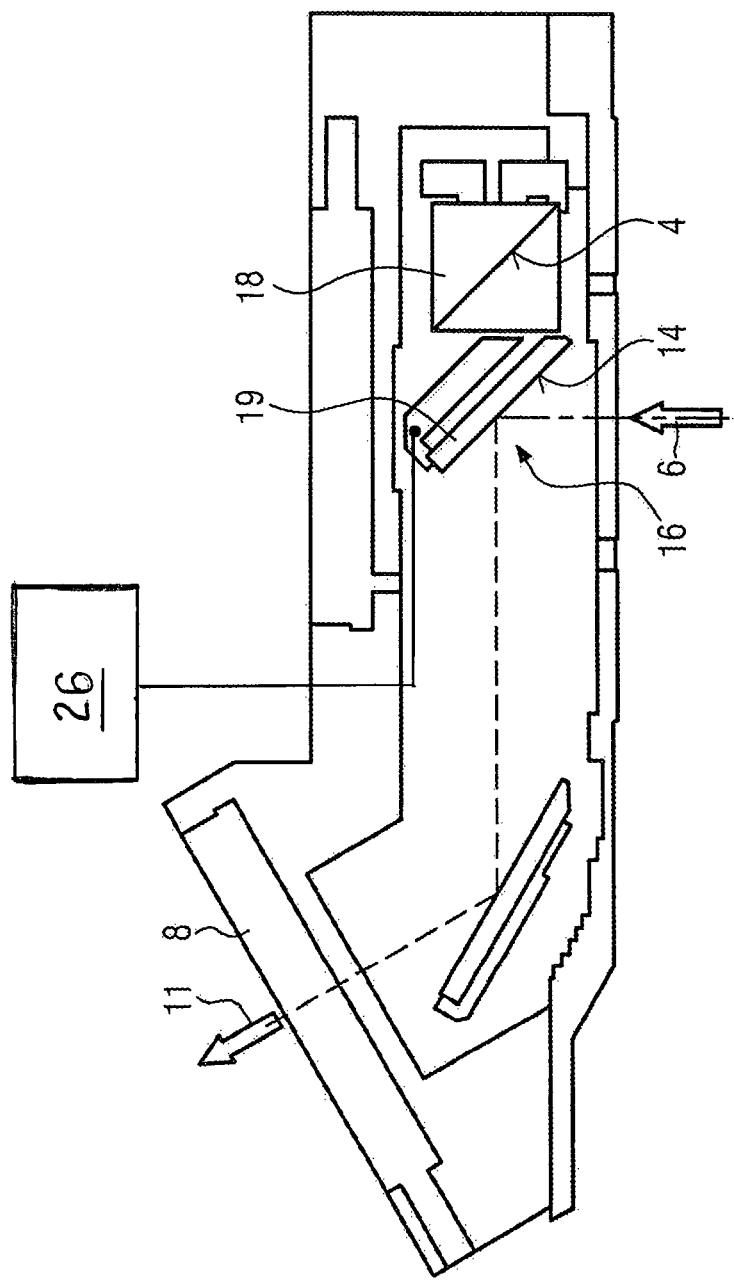

FIG. 4: shows a schematic cut view of the embodiment of FIG. 3 in a second operation position.

Figure 5:
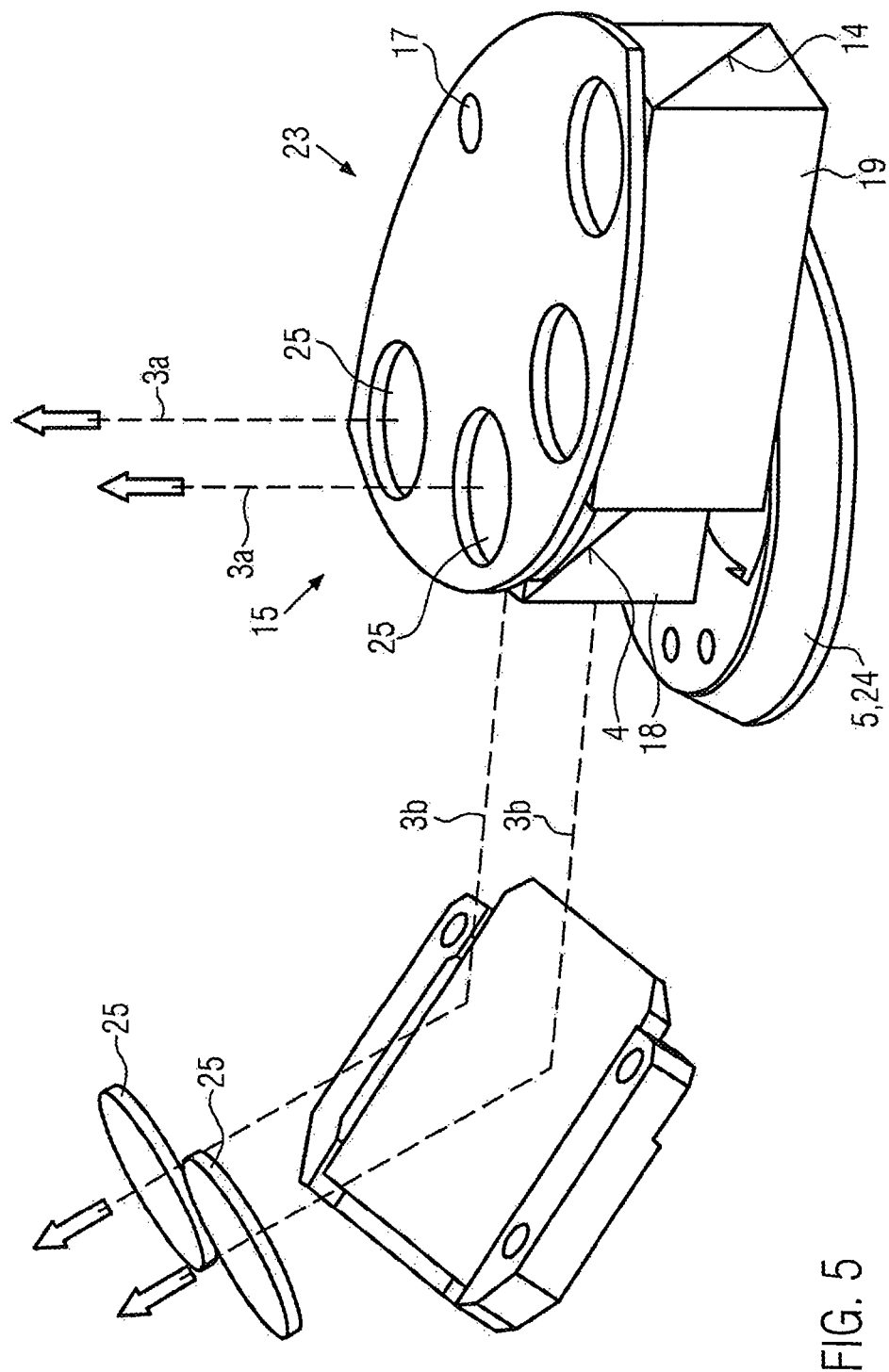

FIG. 5: shows a schematic perspective view of a part of a further embodiment of a beam splitter device according to the invention in a first operation position.

Figure 6:
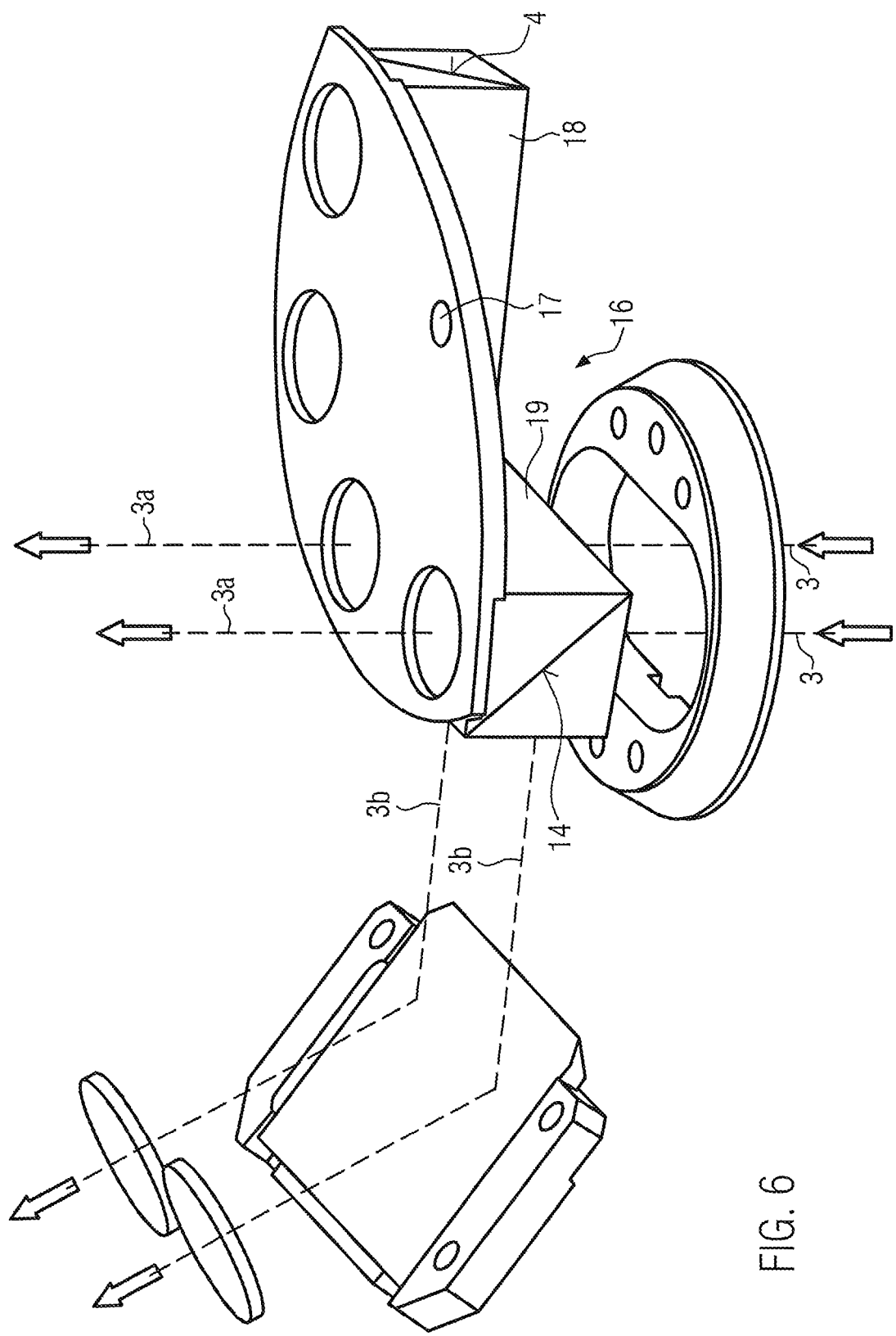

FIG. 6: shows a schematic perspective view of the embodiment of FIG. 5 in a second operation position.

DETAILED DESCRIPTION OF THE INVENTION

First, the design and function of a beam splitter device according to the invention are exemplarily described with reference to the embodiment shown in FIGS. 1 and 2.

As can be seen from FIG. 1, the beam splitter device 1 according to the invention may be configured as a unit which can be mounted as a single pre-assembled part to a microscope 2 which is just schematically represented by phantom lines.

The beam splitter device 1 may also be integrated into a microscope without being a separately mountable or unmountable unit.

The beam splitter device 1 comprises an optical path 3 which may be split into two branches 3*a*, 3*b* by a beamsplitting surface 4. At an entrance port 5 incident light 6 from an object O to be observed enters the beam splitter device 1 and hits the beamsplitting surface 4. The two branches 3*a*, 3*b* of the optical path 3 are directed within the beam splitter device 1 to two respective exit ports 7, 8.

The beamsplitting surface 4 is provided with a predetermined reflection-to-transmission ratio R:T which indicates how much of the incident light 6 is diverted to the branch 3*b* of the optical path 3 which branch 3*b* results from the reflection of the incident light 6 at the surface 4 as compared to the amount of light which is transmitted through the surface 4 and diverted to the branch 3a of the optical path 3. The reflection-to-transmission ratio of a beamsplitting surface 4 is fixed but may range between R:T=0:100, which means that all of the incident light 6 is transmitted and none is reflected, to R:T=100:0, which means all of the incident light 6 is reflected by the beamsplitting surface 4 and none is transmitted.

Just by way of example, the branch 3a of the optical path 3 which is transmitted through the beamsplitting surface 4 is directed to the exit port 7 which may be adapted to receive a binocular tube 9 of the microscope 2. The reflected light 11 may be directed to exit port 8 which may be adapted to receive a camera 27.

The beam splitter device 1 may in particular be suited to a stereoscopic microscope so that the optical path 3 may comprise actually two observation pupils which are situated side by side and of which the optical axes parallel to each other. This is exemplary detailed in the context of FIGS. 5 and 6 below.

In the branch 3b of the optical path 3, a mirror 12 may be arranged so that the branch 3b at the camera exit port 8 is inclined by an angle of less than 90° relative to at least one of the branch 3a at the other exit port 7 and the optical path 3 at the entrance port 5.

A relay lens system 13 may be arranged in the optical path 3b leading to the camera exit port 8. The lens system 13 may be a relay lens system to counter vignetting and/or an afocal zoom lens to alter the magnification available at the camera exit port 8.

Only by way of example, the beamsplitting surface 4, which is arranged in the optical path 3 in FIG. 1, is a compound beam splitter. Of course other types of beam splitters such as polarizing beam splitters, beam splitters resulting from semi-transparently thin coatings, Swiss-cheese beam splitters or dichroic mirrored prisms may be used.

The beam splitter device 1 comprises at least one further beamsplitting surface 14, which has a different reflection-to-transmission ratio than the beamsplitting surface 4. The beam splitter device 1 may include more than two different beamsplitting surfaces 4, each having a different reflection-to-transmission ratio.

In the embodiment shown in FIG. 1, the second beamsplitting surface 14, which in FIG. 1 is not located in the optical path 3, may provide a reflection-to-transmission ratio of 100:0.

The beamsplitting surfaces 4, 14 are supported movably in the beam splitter device so that they can be moved from a first operation position 15, shown in FIG. 1, to a second operation position 16, shown in FIG. 2. In the second operation position 16, the beamsplitting surface 14 is located in the optical path 3 and the beamsplitting surface 4 is not located in the optical path.

Again, just by way of example, the switching from the first operation position 15 shown in FIG. 1 to the second operation position 16 shown in FIG. 2 may be accomplished by a rotation of at least one of, preferably both of the beamsplitting surfaces 4, 14 about an axis of rotation 17 which is perpendicular to the optical path 3 and its branches 3a, 3b. The movement from the first position 15 to the second position 16 may be accomplished manually or with an actuator (not shown) such as a spring device, a solenoid or an electric motor. As the reflection-to-transmission ratio of the two beamsplitting surfaces 4, 14 differs, the amount of light 10, 11 directed to the exit port 7 and the camera exit port 8 varies in the first operation position 15 compared to the second operation position 16.

For example, in the second operation position 16, all incident light 6 is directed to the camera exit port 8 because all light is reflected by the second beamsplitting surface 14.

In the second operation position 16 as shown in FIG. 2, the available light is used fully to create camera pictures, which therefore can increase in quality.

If the exit port 7 has to be used again, the beamsplitting surfaces 4, 14 are moved back from the second operation position 16 to the first operation position 15.

If more than two beamsplitting surfaces are arranged in the beam splitter device 1, further operation positions may be assumed, e.g. by rotating the beam splitter further or by additional translational movements which move further beamsplitting surfaces into the optical path 3.

The first beamsplitting surface 4 may be located on an optical element 18, e.g. a component beam splitter, which is separate from the optical element 19 carrying the second beamsplitting surface 14, which in FIGS. 1 and 2 is part of a mirror 19. In an alternative embodiment, both, or more, surfaces 4, 14 may also be located on a single optical element, e.g. form two different surfaces of a compound beam splitter.

The movement of the at least two beamsplitting surfaces 4, 14 and/or the respective optical elements 18, 19 from the first operation position 15, in which one of the beamsplitting surfaces 4, 14 is moved into the optical path 3, to the second operation position 16, in which another one of the beamsplitting surfaces 14, 4 is moved into the optical path, can result from any combination of rotational and translational movements of the beamsplitting surfaces 4, 14.

This is exemplified by the beam splitter device 1 of FIGS. 3 and 4, which is shown in the first operation position 15 in FIG. 3 and in the second operation position 16 in FIG. 4.

Again, the beam splitter device 1 comprises at least two beamsplitting surfaces 4, 14. In the first operation position 15, the beamsplitting surface 4 is located in the optical path 6, which beamsplitting surface has a reflection-to-transmission ratio different from 0:100 and 100:0, so that the optical path 3 is split into two branches 3a and 3b. The second and any further beamsplitting surface 14 is moved out of the optical path 3, 3a, 3b. If a different reflection-to-transmission ratio to the one provided by the beamsplitting surface 4 is needed, a manipulator 26 (shown schematically in FIGS. 3 and 4) such as a rotatable knob or a displaceable lever, or an electric switch operatively connected to an actuator such as a solenoid or an electric motor may be activated to effect the switching from the first operation position 15 of FIG. 3 to the second operation position 16 of FIG. 4.

In the exemplary embodiment of FIGS. 3 and 4, the beamsplitting surface 4 is moved translationally out of the optical path 3 as indicated by arrow 20. At the same time, beamsplitting surface 14 is moved by a combination of a translational movement 21 and a rotational movement 22. Such a movement can be realized in a simple manner by a slotted guide system, in which the beamsplitting surfaces 4, 14 are guided. The lengths of the translational movements 20, 21 may be the same so that they can be mechanically coupled. The rotational movement 22 may take place at the end of the translational movement 21.

Due to the combined motions 20, 21, 22 the beamsplitting surface 4 is moved out of the optical path and the beamsplitting surface 14 is moved into the optical path 3. Again, the beamsplitting surface 14 may be a mirror with a reflection-to-transmission ratio of 100:0, so that all of the incident light 6 is reflected towards the camera exit port 8 as reflected light 11.

Of course, any other combination of rotational and translational movements of the at least two beamsplitting surfaces 4, 14 is possible.

The at least two beamsplitting surfaces 4, 14 may be provided on a magazine 23 which may be translationally and/or rotationally moveable. In FIGS. 5 and 6, a rotational magazine 23, which serves as a carrier for two beamsplitting surfaces 4, 14 is shown. As can be seen, the optical path 3 and its branches 3a, 3b are actually composed of two parallel paths which correspond to the two observation pupils 25 at the two exit ports 7 and 8. Each of the beamsplitting surfaces 4, 14 is dimensioned to accommodate two observation pupils 25 at the side of the branch 3a of the optical part and two observation pupils 25 at the branch 3b of the optical path 3.

The magazine 23 is held rotatable around an axis 17 of rotation on a frame 24, which is stationary with respect to the microscope. To switch from the first operation position 15 of FIG. 5 to the second operation position of FIG. 6, the magazine 23 is simply rotated about the axis of rotation 17, which in this case may run parallel to at least one part 3, 3a of the optical path and perpendicular to another part 3b of the optical path.

The magazine 23 is configured to successively move different beamsplitting surfaces 4, 14 into and/or out of the optical path in a single continuous motion. For example, a rotation of the magazine moves the beamsplitting surface 4 out of the optical path 3 and moves the other beamsplitting surface 14 into the optical path 3.

Again, as the beamsplitting surfaces 4, 14 have different reflection-to-transmission ratios, by switching from the first operation position 15 to the second operation position 16, a different distribution of the light intensity between the branches 3a and 3b can be obtained.

The embodiment shown in FIGS. 5 and 6 can be easily modified by arranging the axis of rotation 17 of the magazine 23 perpendicular to both parts 3a and 3b of the optical path 3.

To accommodate more than two beamsplitting surfaces, the magazine is simply extended to cover a larger arc along which the different beamsplitting surfaces are arranged.

| | REFERENCE NUMERALS |
|---|---|
| 1. | Beam splitter device |
| 2. | Microscope |
| 3. | Optical path |
| 3a, 3b | Branches of optical path after beam splitting |
| 4. | First beamsplitting surface |
| 5. | Entrance port |
| 6. | Incident light from observed object |
| 7. | (Binocular) exit port |
| 8. | (Camera) exit port |
| 9. | Binocular tube |
| 10. | Transmitted light |
| 11. | Reflected light |
| 12. | Mirror in optical path to (camera) exit port |
| 13. | Lens system, in particular, relay lens system and/or afocal zoom lens |
| 14. | Second beamsplitting surface |
| 15. | First operation position |
| 16. | Second operation position |
| 17. | Axis of rotation |
| 18. | Optical element carrying the first beamsplitting surface |
| 19. | Separate optical element carrying the second beamsplitting surface |
| 20. | Arrow indicating movement of (first) beamsplitting surface |

-continued

| | REFERENCE NUMERALS |
|---|---|
| 21. | Arrow indicating translational movement of (second) beamsplitting surface |
| 22. | Arrow indicating rotation movement of (second) beamsplitting surface |
| 23. | Magazine holding at least two beamsplitting surfaces |
| 24. | Frame for holding magazine |
| 25. | Observation pupil |
| 26. | Manipulator |
| 27. | Camera |
| O | Object to be observed |

What is claimed is:

1. A beam splitter device (1) for a microscope (2), the beam splitter device (1) comprising:
   at least two beamsplitting surfaces (4, 14), each of the at least two beamsplitting surfaces (4, 14) being configured to provide a different reflection-to-transmission ratio; and
   an optical path (3, 3a, 3b);
   wherein at least one of the at least two beamsplitting surfaces (4, 14) is movable from a first operation position (15), in which a first (4) of the at least two beamsplitting surfaces (4, 14) is located in the optical path (3), to a second operation position (16), in which a second (14) of the at least two beamsplitting surfaces (4, 14) is located in the optical path (3);
   wherein in the second operation position (16), the at least two beamsplitting surfaces (4, 14) are rotated about an axis of rotation (17) with respect to the first operation position (15), and the axis of rotation (17) is orthogonal to all portions of the optical path (3, 3a, 3b).

2. The beam splitter device (1) according to claim 1, wherein, in the first operation position (15), the first beamsplitting surface (4) is located at a position in the optical path (3) where, in the second operation position (16), the second beamsplitting surface (14) is located.

3. The beam splitter device (1) according to claim 1, wherein, in the first operation position (15), the optical path (3) is split into at least two branches (3a, 3b) and wherein in the second operation position (16), only one branch (3b) of the optical path (3) is maintained.

4. The beam splitter device (1) according to claim 1, wherein the at least two beamsplitting surfaces (4, 14) are located on a single, moveable optical element (18).

5. The beam splitter device (1) according to claim 1, wherein the at least two beamsplitting surfaces (4, 14) are located on different optical elements (18, 19).

6. The beam splitter device (1) according to claim 1, further comprising a magazine (23) on which the at least two beamsplitting surfaces (4, 14) are attached, the magazine (23) being supported movably by a frame (24) and being connected to a manipulator which is accessible from outside the beam splitter device (1) and which, upon operation, switches the at least two beamsplitting surfaces (4, 14) at least one of from the first position to the second position and from the second position to the first position.

7. The beam splitter device (1) according to claim 1, further comprising a relay lens system (13) in at least one branch (3b) of the optical path.

8. The beam splitter device (1) according to claim 7, wherein at least one lens of the relay lens system (13) is movable for focusing in the beam splitter device (1).

9. The beam splitter device (1) according to claim 1, further comprising an afocal zoom lens (13) in at least one branch (3b) of the optical path (3).

10. The beam splitter device (1) according to claim 9, wherein at least one lens of the afocal zoom lens (13) is movable for focusing in the beam splitter device (1).

11. The beam splitter device (1) according to claim 1, wherein one branch (3b) of the optical path (3) is directed towards an exit port (8) which is configured to receive a camera.

12. The beam splitter device (1) according to claim 1, wherein one (14) of the at least two beamsplitting surfaces (4, 14) has a reflection-to-transmission ratio of 100:0.

13. A microscope comprising a beam splitter device (1), the beam splitter device (1) comprising:
  at least two beamsplitting surfaces (4, 14), each of the at least two beamsplitting surfaces (4, 14) being configured to provide a different reflection-to-transmission ratio; and
  an optical path (3, 3a, 3b);
  wherein at least one of the at least two beamsplitting surfaces (4, 14) is movable from a first operation position (15), in which a first (4) of the at least two beamsplitting surfaces (4, 14) is located in the optical path (3), to a second operation position (16), in which a second (14) of the at least two beamsplitting surfaces (4, 14) is located in the optical path (3);
  wherein in the second operation position (16), the at least two beamsplitting surfaces (4, 14) are rotated about an axis of rotation (17) with respect to the first operation position (15), and the axis of rotation (17) is orthogonal to all portions of the optical path (3, 3a, 3b).

14. A microscope imaging method comprising the steps of:
  directing light (6) from an observed object (O) along an optical path (3, 3a, 3b) to at least two exit ports (7, 8) by way of a first beamsplitting surface (4) in the optical path (3, 3a, 3b) such that a first light (10) is available at a first exit port (7) of the at least two exit ports (7, 8) and a second light (11) is available at a second exit port (8) of the at least two exit ports (7, 8); and
  changing the first light (10) available (10, 11) at the first exit port (7) and the second light (11) available at the second exit port (8) by switching a second beamsplitting surface (14) into the optical path (3, 3a, 3b) instead of the first beamsplitting surface (4), the first and second beamsplitting surfaces (4, 14) having different reflection-to-transmission ratios;
  wherein the changing step comprises rotating the first beamsplitting surface (4) and the second beamsplitting surface (14) about an axis of rotation (17), wherein the axis of rotation (17) is orthogonal to all portions of the optical path (3, 3a, 3b).

\* \* \* \* \*